United States Patent [19]

Upmeier et al.

[11] 4,339,403
[45] Jul. 13, 1982

[54] METHOD OF CONTROLLING THE FILM THICKNESS AT A BLOWN FILM EXTRUDER INSTALLATION

[75] Inventors: Hartmut Upmeier; Gerd Klinge; Gerhard Winkler, all of Lengerich, Fed. Rep. of Germany

[73] Assignee: Windmöller & Hölscher, Lengerich, Fed. Rep. of Germany

[21] Appl. No.: 209,060

[22] Filed: Nov. 21, 1980

[30] Foreign Application Priority Data

Nov. 23, 1979 [DE] Fed. Rep. of Germany ....... 2947293

[51] Int. Cl.³ ............................................. B29D 23/04
[52] U.S. Cl. ................................. 264/40.1; 264/40.6; 264/40.7; 264/564; 425/141; 425/143; 425/144; 425/326.1; 425/381
[58] Field of Search ................... 264/40.7, 40.1, 40.6, 264/563, 564, 565, 566; 425/141, 140, 143, 144, 326.1, 72 R, 381

[56] References Cited

U.S. PATENT DOCUMENTS

| | | | |
|---|---|---|---|
| 3,286,302 | 11/1966 | Doering | 425/326.1 |
| 3,368,007 | 2/1968 | Palmer | 264/564 |
| 3,474,160 | 10/1969 | Doering | 264/40.1 |
| 3,510,374 | 5/1970 | Walker | 425/141 |
| 3,775,035 | 11/1973 | Scotto et al. | 425/141 |
| 3,804,572 | 4/1974 | Upmeier | 425/72 R |
| 3,974,248 | 8/1976 | Atkinson | 425/141 |
| 4,189,288 | 2/1980 | Halter | 264/565 |
| 4,209,475 | 6/1980 | Herrington et al. | 264/40.1 |
| 4,246,212 | 1/1981 | Upmeier et al. | 264/564 |

FOREIGN PATENT DOCUMENTS

2140194 6/1975 Fed. Rep. of Germany .
2723991 11/1978 Fed. Rep. of Germany .
2816583 10/1979 Fed. Rep. of Germany .

OTHER PUBLICATIONS

Article entitled "Prozessregler in der Extrusionstechnik" published 1976.
Article entitled "Möglickkeiten der Prozessrechneranwendung bei Flachfolien-und Tafelextrusionsanlagen," published 1978.

Primary Examiner—Jeffery R. Thurlow
Attorney, Agent, or Firm—Fleit & Jacobson

[57] ABSTRACT

A nozzle ring of an extruder for blowing tubular plastics film is divided into correcting sectors provided with adjusting elements. The thicknesses of the blown film are measured over the circumference thereof and a number of film sectors of equal cross-sectional area corresponding to the number of correcting sectors is established from the measured thicknesses. Assuming that the film sector of maximum or minimum thickness has been extruded in the correct position for the purpose of determining the correcting sector associated with the film sector, the subsequent film sectors of equal cross-sectional area are in turn allocated to successive correcting sectors. The throughput and cross-sectional area or temperature of the respective correcting sector is adjusted until the circumferential lengths of the film sectors are equal.

12 Claims, 4 Drawing Figures

METHOD OF CONTROLLING THE FILM THICKNESS AT A BLOWN FILM EXTRUDER INSTALLATION

The invention relates to a method of controlling the film thickness at a blown film extruder installation, comprising a nozzle ring divided into correcting sectors provided with setting elements, a film calibrating device and a take-off and coiling apparatus for the film.

DE-OS No. 2723 991 discloses an annular gap nozzle which can be centered and DE-AS No. 21 40 194 discloses an annular gap nozzle which is divided into separately regulatable tempering segments, by means of which the distribution of thickness tolerances over the circumference of the extruded material can be influenced when extruding plastics substances.

An earlier patent application of the applicants is concerned with the problem of positionally correctly allocating certain zones of the circumference of the inflated or flattened tubular film of which the thickness has been measured to the sectors of the nozzle ring from which these were extruded, with due regard to the twist which the tubular film has undergone as a result of the reversing take-off, whereby, if departures in the thickness were measured in the film sectors corresponding to the circumferential zones, appropriate corrections can be undertaken at the associated sectors of the nozzle ring.

The inventors have discovered that the sectors of the film bubble at which the thickness was measured cannot be allocated to the sectors of the nozzle ring from which they were extruded solely by mathematically reversing the twist to which the film bubble has been subjected as a result of the reversing take-off or by reversing the twist by way of appropriately turning the measuring equipment. This is because the individual sectors of the extruded and inflated tubular film are also twisted relatively to the nozzle ring because thick portions assume a smaller sector and thin portions a larger sector and the thick and thin portions influence one another, so that by simply considering turning of the bubble caused by the reversing take-off one cannot positionally correctly allocate the individual film sectors to the appropriate sectors of the nozzle ring.

It is the problem of the invention to improve the method of controlling the film thickness at a blown film extruder installation in that the film sectors over which the thickness tolerances were measured can be positionally correctly allocated to the nozzle ring sectors with setting elements while considering the displacement of the film sectors in the circumferential direction as a result of thin and thick portions.

According to the invention, this problem is solved in that a number of film sectors of equal cross-sectional area corresponding to the number of correcting sectors is established from the film thicknesses measured over the film circumference, that the film sector of maximum or minimum thickness is assumed as having been extruded in the correct position for determining the associated correcting sector at the nozzle ring and the subsequent film thicknesses of equal cross-sectional area are successively allocated to the subsequent correcting sectors, and that the throughput and the cross-sectional area or the temperature of the respective correcting sector at the nozzle ring is changed until the circumferential lengths of the film sectors of equal cross-sectional area are equal. To compensate for measured thickness tolerances, one can first assume that film sectors of equal cross-sectional area were extruded with equal circumferential lengths from the associated correcting sectors of the nozzle ring. If the nozzle ring is subdivided into an adequate number of correcting sectors, one can assume that no marked fluctuations of thickness tolerances will be present in the film sectors extruded therefrom with equal cross-sectional areas if they have the same circumferential length.

The setting elements of the nozzle ring can also change the temperature of the respective correcting sector until the circumferential lengths of the film sectors of equal cross-sectional area are equal. This influence in the temperature of the correcting sectors can be provided instead of or in addition to centering of the nozzle ring or influencing the throughput of the nozzle ring.

The method of the invention is applicable to blown film extruder installations with or without a reversing film take-off. In the case of reversing film take-off, the film sector assumed to have been extruded in the correct position is associated with its correcting sector by appropriately turning it back. This reverse rotation can be undertaken mathematically or by appropriately turning and twisting the measuring devices. Since the control according to the invention avoids marked fluctuations in the film thickness tolerances, it enables the reversing film take-off for the helical distribution of thick and thin portions over the coil of film to be dispensed with.

The control method of the invention in which the thickness tolerances over the circumference of the tubular film are at first not measured positionally correctly in relation to the setting means at the nozzle ring and subsequently allocated thereto in the correct position can be embodied particularly advantageously by employing microprocessors. For this purpose a particularly preferred embodiment of the invention provides for the features that the circumference of the inflated or flattened tubular film is divided into film sectors of equal circumferential lengths and of a number at least as high as the number of correcting sectors, the film sectors forming measuring sectors over the circumferential length of which the film thickness is measured, that the mean thickness value is formed for each film sector from the measured thicknesses, that film sectors are subsequently formed with widths which are enlarged or reduced in the ratio of the mean film thickness to the respective mean thickness value, that the corrected widths are summated as thin portions or thick portions and the total sum is divided by the number of correcting sectors, and that new mean thickness values are formed over the film sectors associated with the correcting sectors at the nozzle ring, which new sectors represent a measure for the correcting command for the setting apparatus of the positionally correctly associated correcting sector. By converting the widths of the film sectors uniformly divided over the film circumference in the ratio of the partial mean thickness values to the mean film thickness, the sector widths are reduced in the case of thin portions and increased in the case of thick portions. If, now, the sum is formed of all the widths of the converted part sectors and this sum is divided by the number of correcting sectors at the nozzle ring, film sectors are formed which, as long as different thickness tolerances are being measured, exhibit different lengths in the circumferential direction. The film sectors having the absolute minimum and/or maximum of thickness are registered as positionally correct in relation to the associated correcting sector at the nozzle ring, i.e. the sector of the nozzle gap from which these were assumed to be extruded. All the other converted part sections are laterally displaced corresponding to the position of the tolerance minimum or maximum. The partial mean thickness values of the now positionally correct film sectors represent the measure for the correcting pulse of the setting elements associated with the correcting sectors of the nozzle ring.

Desirably, the number of measuring sectors at the film bubble is a multiple of but at least four times the number of correcting sectors at the nozzle of the film blow head.

One example of the invention will now be described in more detail with reference to the drawing, wherein.

Figure 1:
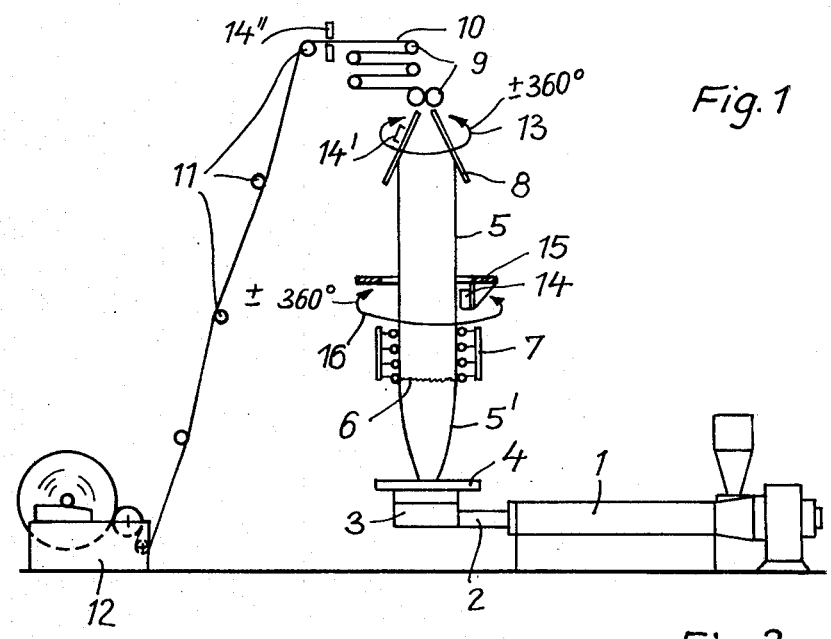
FIG. 1 is a diagrammatic side elevation of a blown film installation with means for detecting the thickness tolerances.
Figure 2:
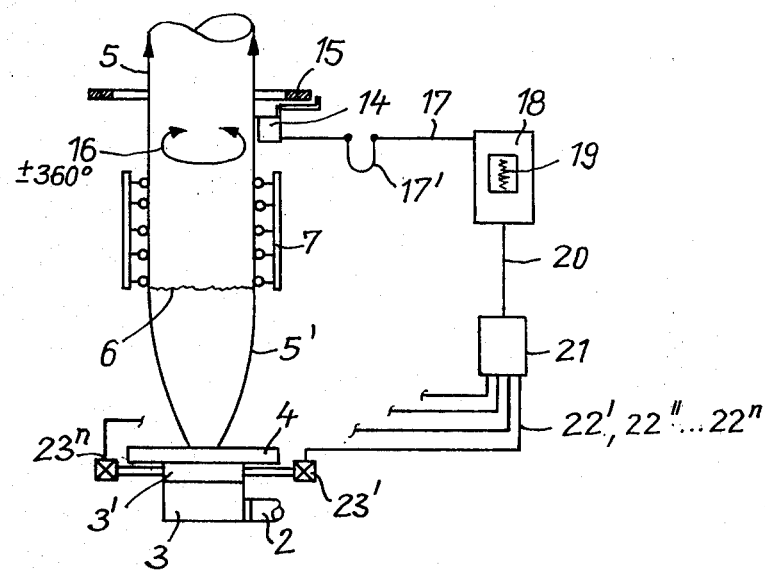
FIG. 2 is a diagrammatic representation of the relationship between the thickness measuring apparatus and the setting elements for correcting the nozzle gap.

In the installation diagrammatically illustrated in FIG. 1, the extruder 1 feeds the thermoplastic melt to be processed through the connector 2 into the film blowhead 3 having the cooling ring 4 where the melt is formed into the tubular film 5. At the level of the film rigidification line 6 there is a diagrammatically indicated film calibrating apparatus 7 which determines the diameter of the tubular film and thus the width of the flattened web of film. The tubular film is flattened by means of the flattening plates 8, withdrawn by the take-off rollers 9 and the subsequent reversing rollers 9 and fed as a flattened web 10 of film over the guide rollers 11 to the stationary coiler 12 where it is coiled.

Preferably above the calibrating apparatus 7, the measuring head 14 is disposed on an annular cross-member 15, the arrow 16 showing the measuring movement through ±360°. The measuring movement is superimposed on the rotation of the tubular film caused by the reversing take-off, so that one measurement of thickness always takes place over the full circumference of the tubular film.

A measuring apparatus 14 determining the single film thickness can for example also be disposed at the position 14' of one of the flattening plates 8 or behind the reversing take-off apparatus 9 at one margin of the flattened web 10 of film as a measuring system 14''. In the latter case, one measures the double film thickness which can, with sufficient accuracy, be utilised as the thickness measurement value for the single web of film because the measurement takes place directly at the margin at which sudden changes in the film thickness are not to be expected. The thickness measurement over the entire circumference of the tubular film is effected by reason of its twist caused by the reversing take-off.

The measuring signal of the rotary measuring head 14 is fed to the thickness profile indicating box 18 by way of the measuring line 17 which has the cable loop 17' permitting the reversing motion, and the signal is represented on the thickness tolerance diagram 19. The thickness measurement signal can be fed as an electrical value over the connecting line 20 to a microprocessor 21 which appropriately converts the measuring signals and feeds the setting commands to the centering apparatuses or setting elements $23'\ldots 23^N$ by way of the connecting lines $22', 22''\ldots 22^N$.

One revolution of the measuring signal through 360° of the film circumference which is represented in the indicating box 18 in diagram form 19 is divided by the microprocessor 21 into a certain number of measuring sectors $x_F$ of equal angle and thus of equal circumferential lengths. Conforming to the course of the thickness measurement values, the mean film thicknesses $\bar{s}'_x$ of each film or measuring sector $x_F$ are formed over the measuring sectors $x_F$, the thin portions being represented as partial mean values 24' and the thick portions as partial mean values 25'. Desirably, the number of measuring sectors $x_F$ is a multiple of, but preferably at least four times, the number of correcting sectors $x_K$ at the nozzle ring.

Figure 3:
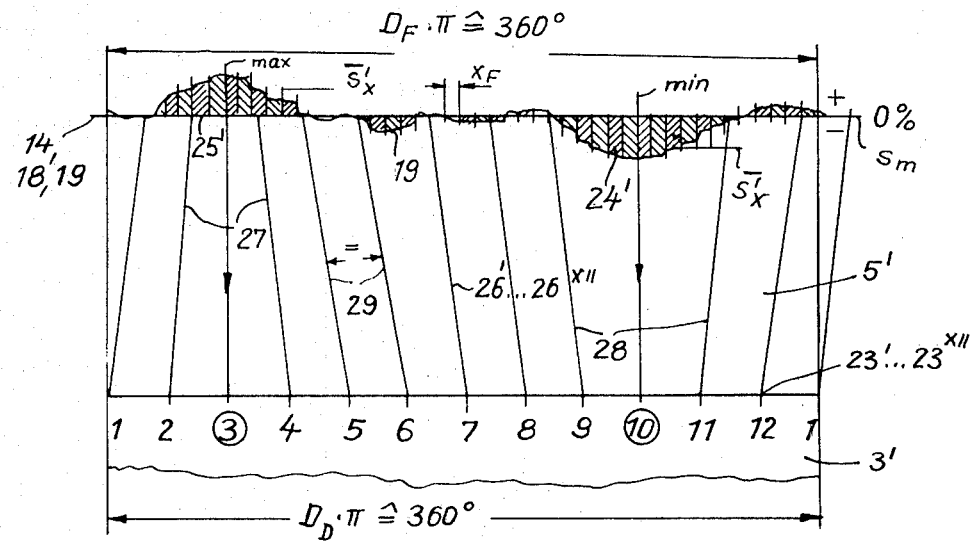
FIG. 3 is a quantitative representation of the relationships between the thickness tolerance in the blown film and the nozzle gap.

By transmission to a circumference of 360°, the values going into the calculation are made dimensionless in accordance with the following considerations:

A volumetric consideration permits one to prove that the connecting lines $26^I\ldots 26^{XII}$ bounding the individual correcting sectors $x_K$ or running therethrough centrally extend over the widened zone 5' as converging lines 27 for the thick film portions and as diverging lines 28 for the thin film portions, as will be evident from the dimensionless representation of FIG. 3, i.e. reduced to a until film diameter. In the case of film zones with the thickness tolerance ±0%, these lines extend as parallel lines 29 which, however, are laterally inclined because of the adjacent thick and thin portions.

In accordance with observations, the film sectors with the absolute largest thick or thin portion are positionally correctly allocated to the associated correcting sectors. These correcting sectors are understood to mean the film sectors extruded from the correcting sectors at the nozzle ring. The adjoining sectors disposed between the correcting sectors having absolute thick or thin portions are interposed with lateral displacement between the positions determined by the maximum or minimum tolerance.

From analog considerations, the following equations are obtained:

(1) $V_{Fx} = x_F \cdot s_m \,V_{Fx} =$ Film volume over all
    $= \Sigma x_F \cdot \bar{s}'_x$     $x_F$ film sectors, length and width = 1

(2) $\bar{x}_F = \dfrac{\bar{s}'_x}{s_m}$ $s_m =$ Mean total film thickness
    $x_F =$ Number of film sectors, width of one sector = 1
    $\bar{s}'_x =$ Mean film thickness of the film sector $x_F$ (3) $\Sigma \bar{x}_F = x_K$    $\bar{x}_F =$ Corrected width of the film sectors $x_F$
                                 $> 1$ at $\bar{s}'_x > s_m$
                                 $= 1$ at $\bar{s}'_x = s_m$
                                 $< 1$ at $\bar{s}'_x < s_m$
            $x_K =$ Number of correcting sectors, width of one sector = 1.

By regarding, for example, only the thin portions, one obtains substantially the following manner of operation for the partial operating memory of the microprocessor:

| | |
|---|---|
| $\bar{s}'_x \leq s_m$ | Memory starts |
| $\bar{s}'_a$ 1,2,3 ... $< s_m$ | Corrected widths $\bar{x}_F$ a 1,2,3 ... stored |
| $\bar{s}'_b = $ min | Sector b stored as positionally correct (after conclusion of storage) |
| $\bar{s}'_c$ 1,2,3 ... $< s_m$ | Corrected widths $\bar{x}_{Fc}$ 1,2,3 ... stored |
| $\bar{s}'_x = s_m$ | End of storage. |

The microprocessor operates correspondingly for the thick portions. It should be programmed in accordance with the following steps:

The microprocessor 21 first computes the partial mean values $\bar{s}_x'$ of the film sectors 24', 25'.

In the next step, the corrected widths $\bar{x}_F'$ of the film sectors $x_F$ are formed according to equation (2) and summated as thin portions 24" or thick portions 25".

The total sum of the corrected widths $\bar{x}_f$ which correspond to a 360° circumference is subsequently divided by the number $x_K$ of correcting sectors.

Figure 4:
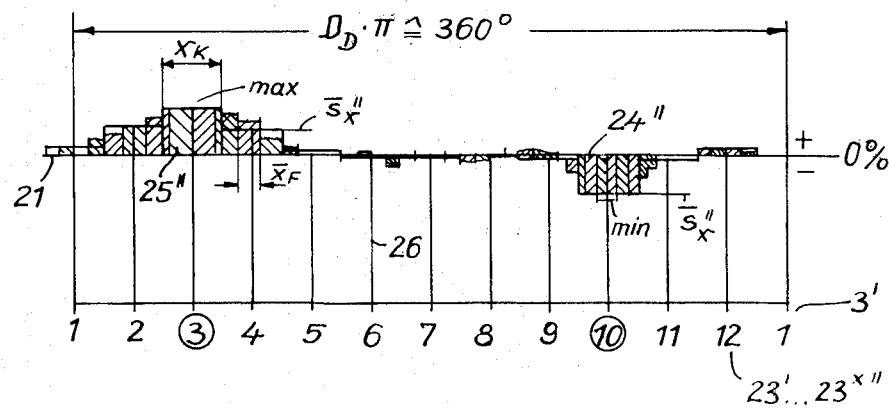
FIG. 4 is a diagrammatic representation of the conversion of the measured values for the positionally correct allocation to the correcting sectors at the nozzle ring.

In the example shown in FIGS. 3 and 4, the thick film portion is correctly positioned to the correcting sector 3 and the thin portion is correctly positioned to the correcting section 10, these sectors being encircled for emphasis.

In the correcting sectors $x_K$ (FIG. 4) thus determined, new partial mean values $\bar{s}_x''$ are formed which represent a measure for the correcting command for the positionally correctly associated centering apparatus or the setting element 23.

Since the marked maxima or minima of the thickness tolerances are gradually brought to zero with progressive improvement in the thickness tolerances, it is advantageous for the then resulting flatter minima and maxima tolerances to transmit these in position to the correctly positioned film sectors and to interpose the remaining measuring sectors with lateral displacement by the microprocessor 21.

With a setting of the nozzle to a uniform gap width, the film thickness tolerances result from different melt temperatures or melt viscosities. Thick portions are formed in zones having a low melt temperature or high viscosity. Thin portions are formed in zones of high melt temperature or low viscosity. These different viscosities influence the transverse stretched conditions at the film bubble in such a way that, by reason of the low viscosities, the thin portions are unevenly stretched more intensively than the thick portions, so that stretching is impeded for the thick portions by the high viscosities. These different transverse stretching forces in the different film sectors do not however influence the foregoing volumetric considerations in the course of the film thicknesses. They can be taken into account by correct factors during determination of the corrected widths $\bar{x}_F$ in that the corrected width is extended slightly further by the correcting factor in the case of thick portions and the corrected width is reduced slightly more in the case of thin portions.

The setting elements 23 of the correcting sectors at the nozzle ring can for example be centering screws actuated by gear motors but this permits only a relatively coarse arrangement for constructional reasons. Further, this centering system is relatively prone to wear.

A more refined version employs heating and/or cooling sectors which can be arranged much more closely on the circumference of the nozzle ring. They have the advantage of operating substantially free from wear.

With an adequate centering effect, one can for example employ only the principle of sector cooling because in this case the thin portions are firstly brought towards zero, whereafter new but smaller thin portions result from the automatic control of the take-off speed (the mean film thickness), which thin portions can then again be automatically corrected because by this method the thick portions are also removed progressively. However, it is also possible to provide sector heating at the thick portions of the film, whereby the tolerances are compensated more rapidly.

The accuracy of measurement and control is improved the larger the ratio of measuring sectors is to the correcting sectors.

As soon as the thickness tolerances have been brought towards zero, the connecting lines $26^I \ldots 26^{XII}$ are practically parallel in the dimensionless representation. In this operating condition, the use of reversing components in the blown film installation (blowhead or reversing take-off apparatus) is no longer necessary because the quality of coiling that is achieved is completely adequate for the further processing of the blown film. One can dispense with the conventional manual centering of the nozzle ring, so that the latter can be fixed.

We claim:

1. A method of controlling the film thickness at a blown film extruder installation, the installation comprising a nozzle ring divided into correcting sectors provided with setting elements for extruding tubular film, a film calibrating device, and a take-off and coiling apparatus for the film, said method comprising measuring film thicknesses over the film circumference at a location spaced from the nozzle ring; establishing a number of film sectors of equal cross-sectional area corresponding to the number of correcting sectors from the film thicknesses measured over the film circumference; determining a film sector of maximum or minimum thickness and assuming such film sector has been extruded in a predetermined position with respect to the nozzle ring for determining the associated correcting sector at the nozzle ring; successively allocating adjacent film thicknesses of equal cross-sectional area to subsequent correcting sectors; influencing the respective correcting sectors at the nozzle ring until the circumferential lengths of the film sectors of equal cross-sectional area are equal.

2. A method according to claim 1, characterised in that influencing of the respective correcting sectors is accomplished by changing the temperature of the respective correcting sector at the nozzle ring until the circumferential lengths of the film sectors of equal cross-sectional area are equal.

3. A method according to claim 1 or claim 2, characterised in that in the case of a reversing film take-off, the film sector assumed to be extruded in the correct position is allocated to its correcting sector at the nozzle ring by appropriate turning back of the extruded film.

4. A method according to claim 1, characterised in that the film circumference of the extruded tubular film is divided into film sectors of equal circumferential length and of a number at least as high as the number of correcting sectors ($x_K$), the film sectors forming measuring sectors ($x_F$) over the circumferential length of which the film thickness is measured, that the mean thickness value ($s_x'$) is formed for each film sector (24', 25') from the measured thicknesses, that film sectors (24", 25") are subsequently formed with widths ($x_F$) which are enlarged or reduced in the ratio of the mean film thickness ($s_m$) to the respective mean thickness value ($s_x'$), that the corrected widths ($x_f$) are summated as thin portions (24") or thick portions (25") and the total sum is divided by the number of correcting sectors ($x_K$), and that new mean thickness values ($s_x''$) are formed over the film sectors associated with the correcting sectors at the nozzle ring, which new sectors represent a measure for the correcting command for the setting elements of the respective positionally correctly associated correcting sectors at the nozzle ring.

5. A method according to claim 4, characterised in that the number of measuring sectors (24', 25') is a multiple of, but at least four times, the number of setting elements (23) associated with the correcting sectors at the nozzle ring.

6. A method according to claim 4, characterised in that for positionally correctly allocating the measured film thickness tolerances to the correcting sectors at the nozzle ring, the part sectors associated with the positions of the absolute minimum and maximum thickness tolerance are allocated one half to each side of said positions, and the other part sectors are inserted with lateral displacement.

7. A method according to claim 4, characterised in that to process the thickness measurement signals for controlling the setting elements (23) there is provided a microprocessor (21) with proportional integral loss behaviour and of which the dead times and proportional zones are freely selectable.

8. A method according to claim 7, characterised in that in the case of several equal maxima and/or minima of thickness tolerances, these are communicated in position to positionally correct film sectors and the others are inserted with lateral displacement by the microprocessor (21).

9. A method according to claim 4 characterised in that for the setting element provision is made for set screws with gear motor drive or electrically heated and controlled expansion members or heating and/or cooling chambers at the periphery of the nozzle ring.

10. A method according to claim 4, characterised in that in the case of thick portions the corrected width is slightly further widened by the correcting factor and in the case of thin portions the corrected width is slightly further reduced.

11. A blown film extruder installation comprising:
a nozzle ring for extruding tubular film divided into correcting sectors;
means for influencing each of the correcting sectors to thereby vary the thickness of extruded tubular filing;
calibrating means spaced from said nozzle ring for calibrating the width of the extruded tubular film;
measuring means for measuring film thicknesses over the circumference of the extruded tubular film;
means for removing extruded tubular film from said nozzle ring and for coiling the removed extruded tubular film; and
control means for controlling said means for influencing comprising:
means for dividing the measured film thicknesses into a predetermined number of film sectors of equal cross-sectional area corresponding to the number of correcting sectors;
means for determining a mean film thickness and for determining a film sector having the greatest deviation from the mean film thickness;
means for assigning the film sector having the greatest deviation to a selected one of the correcting sectors of the nozzle ring;
means for successively allocating film sectors adjacent to the assigned film sector to corresponding correcting sectors adjacent the selected correcting sector; and
means for actuating said means for influencing to thereby vary the thickness of extruded tubular film until the circumferential lengths of the sectors of equal cross-sectional area are equal.

12. A method according to claim 1, wherein mean values of thickness are determined for each film sector, said mean values being used to determine correction commands for influencing the respective correcting sectors at the nozzle ring.

* * * * *